United States Patent
Covington et al.

(10) Patent No.: US 10,926,183 B2
(45) Date of Patent: Feb. 23, 2021

(54) OUTCOME PREDICTION

(71) Applicant: Tag.bio, Inc., San Francisco, CA (US)

(72) Inventors: Thomas Clark Covington, San Francisco, CA (US); Jesse Thomas Paquette, San Francisco, CA (US)

(73) Assignee: Tag.bio, Inc., San Francisco, CA (US)

( * ) Notice: Subject to any disclaimer, the term of this patent is extended or adjusted under 35 U.S.C. 154(b) by 966 days.

(21) Appl. No.: 15/138,125

(22) Filed: Apr. 25, 2016

(65) Prior Publication Data

US 2016/0310850 A1    Oct. 27, 2016

Related U.S. Application Data

(63) Continuation of application No. PCT/US2016/029089, filed on Apr. 24, 2016.

(60) Provisional application No. 62/152,687, filed on Apr. 24, 2015.

(51) Int. Cl.

| | |
|---|---|
| *G07F 17/32* | (2006.01) |
| *A63F 13/828* | (2014.01) |
| *G06Q 50/34* | (2012.01) |
| *A63F 13/65* | (2014.01) |
| *A63F 13/816* | (2014.01) |
| *G06K 9/00* | (2006.01) |
| *G06N 7/00* | (2006.01) |
| *A63B 24/00* | (2006.01) |

(52) U.S. Cl.
CPC ........... *A63F 13/828* (2014.09); *A63F 13/65* (2014.09); *A63F 13/816* (2014.09); *G06K 9/00724* (2013.01); *G06N 7/005* (2013.01); *G06Q 50/34* (2013.01); *G07F 17/32* (2013.01); *G07F 17/3288* (2013.01); *A63B 2024/0056* (2013.01)

(58) Field of Classification Search
CPC ................... A63B 2024/0056; G06K 9/00724
See application file for complete search history.

(56) References Cited

U.S. PATENT DOCUMENTS

| | | | |
|---|---|---|---|
| 6,394,895 B1 * | 5/2002 | Mino | A63F 13/005 273/139 |
| 8,229,715 B1 | 7/2012 | Teller et al. | |
| 8,818,788 B1 | 8/2014 | Mihalik et al. | |
| 8,876,638 B2 * | 11/2014 | Paul | G06F 19/00 273/108.3 |
| 9,082,151 B2 | 7/2015 | Snell et al. | |
| 9,454,726 B1 | 9/2016 | Yao et al. | |

(Continued)

OTHER PUBLICATIONS

Paquette, J. et al. "Hypergraph visualization and enrichment statistics: how the EGAN paradigm facilitates organic discovery from Big Data." *Proc. of SPIE-IS&T Electronic Imaging*, SPIE. vol. 7865, 2011. Web. Jul. 21, 2016.

*Primary Examiner* — Steven J Hylinski
(74) *Attorney, Agent, or Firm* — Mintz Levin Cohn Ferris Glovsky and Popeo, P.C.

(57) ABSTRACT

Outcome predictions based on historical data relating to events in a "game" (which can be a sports context, an e-sports contest, a business situation, a medical situation, or other scenarios) can be generated using a watcher process that receives event data and triggers conversion of a "different" last event received into arguments for one or more analysis protocols, which are executed against a data model created by an analysis engine. Methods, systems, articles of manufacture, and the like are described.

19 Claims, 6 Drawing Sheets

(56) References Cited

U.S. PATENT DOCUMENTS

| | | |
|---|---|---|
| 10,078,689 B2 | 9/2018 | Romano |
| 10,467,261 B1 | 11/2019 | Doyle |
| 2004/0235565 A1* | 11/2004 | Shiozawa ............... A63F 13/10 463/32 |
| 2008/0103997 A1* | 5/2008 | Fein .................... G06F 16/2462 706/12 |
| 2008/0188353 A1* | 8/2008 | Vitolo .................. A61B 5/1036 482/8 |
| 2008/0312010 A1* | 12/2008 | Marty ................ A63B 24/0003 473/447 |
| 2009/0262137 A1 | 10/2009 | Walker et al. |
| 2010/0035672 A1 | 2/2010 | Root |
| 2010/0114739 A1 | 5/2010 | Johnston |
| 2010/0298958 A1* | 11/2010 | Connelly ............... A63B 71/06 700/93 |
| 2011/0014974 A1* | 1/2011 | Torf .................... G07F 17/3223 463/25 |
| 2011/0066506 A1 | 3/2011 | Sung et al. |
| 2011/0093418 A1* | 4/2011 | Kwok .................... G06N 3/006 706/12 |
| 2011/0143868 A1* | 6/2011 | Marty ................ A63B 69/0071 473/447 |
| 2011/0276364 A1 | 11/2011 | Bergstrom et al. |
| 2012/0214575 A1 | 8/2012 | Amaitis et al. |
| 2013/0267328 A1* | 10/2013 | Heisler .................. G06Q 30/02 463/42 |
| 2013/0314241 A1 | 11/2013 | Jamison et al. |
| 2014/0018156 A1* | 1/2014 | Rizzotti .................. A63F 13/12 463/25 |
| 2014/0089233 A1* | 3/2014 | Ellis .................... G07F 17/3218 706/11 |
| 2014/0173622 A1 | 6/2014 | Thompson |
| 2014/0180451 A1* | 6/2014 | Marty ................ G09B 19/0038 700/91 |
| 2014/0195334 A1 | 7/2014 | Emans et al. |
| 2014/0196062 A1 | 7/2014 | Emans et al. |
| 2014/0196081 A1 | 7/2014 | Emans et al. |
| 2014/0201063 A1 | 7/2014 | Snell et al. |
| 2014/0310353 A1 | 10/2014 | Schneider et al. |
| 2015/0006440 A1 | 1/2015 | Nicholson et al. |
| 2015/0065214 A1* | 3/2015 | Olson .................... A63F 13/65 463/9 |
| 2015/0127652 A1 | 5/2015 | Romano |
| 2015/0131845 A1* | 5/2015 | Forouhar ........... G06K 9/00724 382/100 |
| 2015/0148129 A1* | 5/2015 | Austerlade ............. H04L 43/04 463/31 |
| 2015/0220252 A1 | 8/2015 | Mital et al. |
| 2015/0370909 A1 | 12/2015 | Volach |
| 2016/0055221 A1 | 2/2016 | Paquette et al. |

* cited by examiner

OUTCOME PREDICTION

CROSS-REFERENCE TO RELATED APPLICATION

The current application claims priority under 35 U.S.C. § 119(e) to U.S. provisional application Ser. No. 62/152,687 filed Apr. 24, 2015 and under 35 U.S.C. § 120 to Patent Cooperation Treaty application serial no. PCT/US2016/029089, the disclosures of which are incorporated herein by reference in its entirety.

TECHNICAL FIELD

The subject matter described herein relates to data analysis and to outcome prediction based on data analysis.

BACKGROUND

Data analysis can be a powerful tool for making predictions about possible outcomes in situations in which historical data can be effectively leveraged in light of recent events to identify outcome probabilities for one or more possible outcomes. Possible (but non-limiting) applications for a tool capable of making these outcome predictions in an efficient and accurate manner include sports outcomes, business outcomes, medical outcomes, etc. Currently available approaches to data analysis based outcome prediction are generally not accessible without significant expertise in data science and/or computer programming.

SUMMARY

In one aspect, a method can include initiating a watcher process to correspond to a designated game for which event data representative of a plurality of events occurring in the designated game are generated, converting the event data for a most recently received event of the plurality of events into one or more arguments for one or more analysis protocols, and executing the one or more analysis protocols against a data model created by an analysis engine. The watcher process receives the event data, which includes events pertaining to the designated game, from an event data source. The converting occurs when the most recently received event received by the watcher process differs from a previously received event. The executing includes the analysis engine calculating an adjusted probability of at least one outcome relevant to the designated game. The calculating reflects the event data for the most recently received event. The method can further include notifying a client application server to update a last event cache accessible by client application executing on a client machine to display an outcome prediction based on the adjusted probability.

In some variations one or more of the following features can optionally be included in any feasible combination. The analysis engine can calculate the adjusted probability using a tag overlap analysis method. The watcher process can track the plurality of events occurring during the designated game. The data source can include an external event application programming interface. The receiving of the event data can include at least one of the watcher process pulling the event data from the event data source, the watcher process receiving the event data pushed to it by the event data source, and the event data being received by the watcher process according to a preset schedule. The method can further include submitting, by a game daemon to game database, new event information comprising at least one of information about the most recently received event and analysis results comprising the adjusted probability. The designated game can include at least one of a sports contest and a baseball game.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more programmable processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or in multiple computing systems. Such multiple computing systems can be connected and can exchange data and/or commands or other instructions or the like via one or more connections, including but not limited to a connection over a communication network (e.g. the Internet, a wireless wide area network, a local area network, a wide area network, a wired network, or the like), via a direct connection between one or more of the multiple computing systems, over a shared bus, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to outcome prediction in a sports context, it should be readily understood that such features are not intended to be limiting. For example, outcome predictions consistent with the approaches described herein can be applicable to many situations in which historical data are available. Such situations can include physical sports, electronic sports (e.g. video games), gambling on physical and/or electronic sports, medical treatments and/or health outcomes, investment decisions, business outcomes, etc., among others. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Currently available approaches to data analysis and predictive modeling generally lack a capability to process potentially large historical data sets in a manner that allows outcome predictions to be generated and presented to a user quickly (even for very large historical data sets) and without the user needing a detailed knowledge or expertise in data analysis techniques, programming, etc. Various features described herein may provide advantages over previously available approaches. Such advantages may include, but are not necessarily limited to, improvements in usability (e.g. user experience), greater efficiency in use of computing resources (e.g. bandwidth, memory, processor cycles, etc.), and the like.

Figure 1:
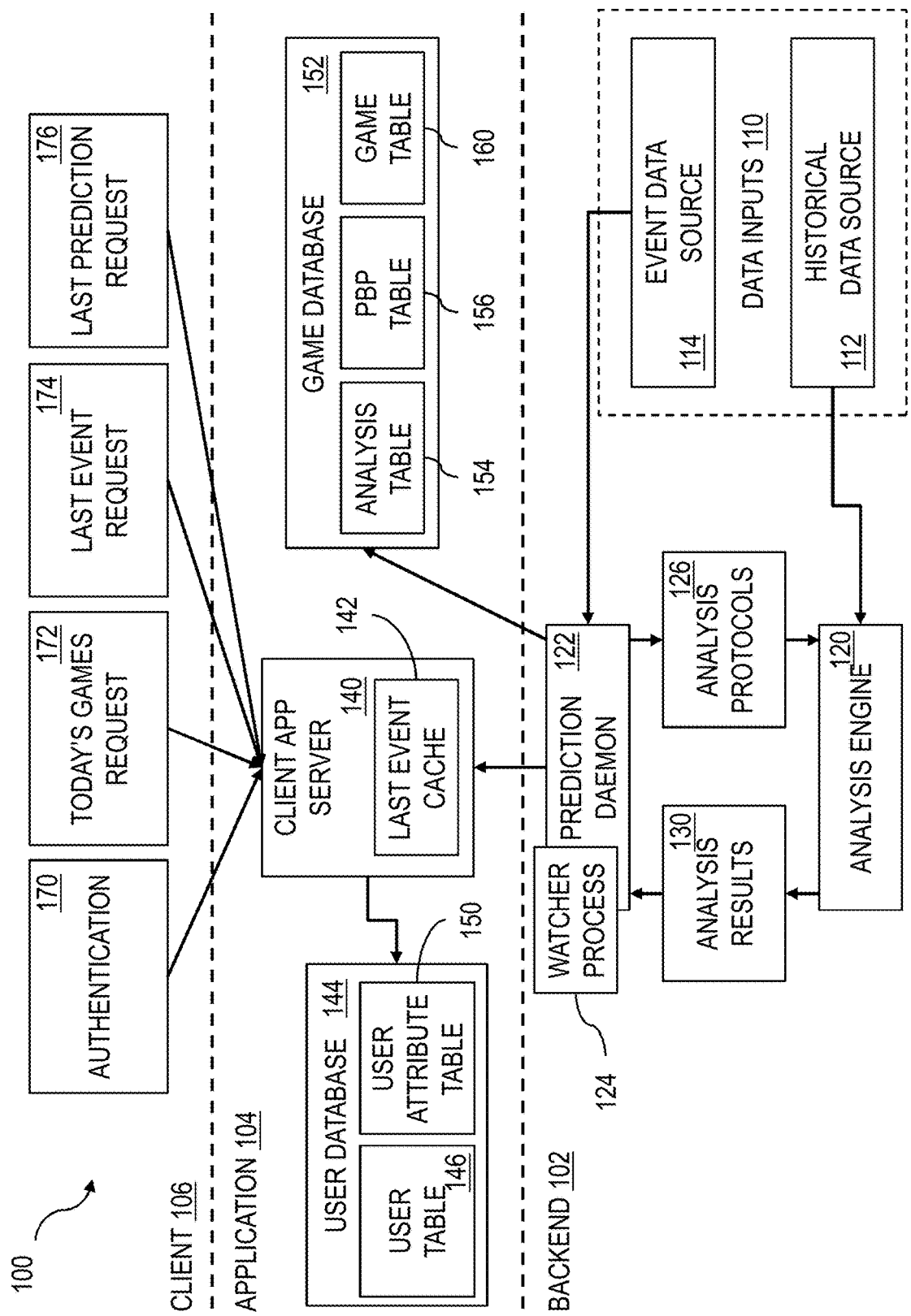
FIG. 1 shows a diagram illustrating aspects of a system showing features consistent with implementations of the current subject matter.

FIG. 1 shows a multi-layer architecture diagram of a prediction system 100 consistent with implementations of the current subject matter. The prediction system 100 includes a backend layer 102, an application layer 104, and a client layer 106. The backend layer 102 receives data inputs 110, which can include one or more historical data sources 112 and an event data source 114, which can, in some examples, be an event application program interface (API). In an example related to outcome predictions for a baseball game, a historical data source 112 is a baseball related historical data source, and an event data source 114 is a baseball event API. The backend layer 102 also includes an analysis engine 120, which accesses the historical data source 112 to make a series of calculations based on a data model, as well as a prediction handler daemon 122. It will be understood that the backend layer 102, the application layer 104, and the client layer 106 can optionally be implemented all on a single computing system or alternatively with one or more components implemented on different computing systems. In an example in which implementation occurs on multiple computing systems, discrete systems or groups of systems can be assigned to functions of the various layers. Alternatively, the components of the layers 102, 104, 106 need not be segregated in this manner (e.g. two or more systems can include components of the backend layer 102 and the application layer 104, etc.).

In an example consistent with FIG. 1, in which the prediction system 100 is used for sports-related predictions, and more specifically for baseball-related predictions, the prediction handler daemon 122 is a game daemon 122. Every night during a baseball season (or at some other relevant interval), the game daemon 122 pulls or otherwise accesses a schedule of upcoming games (e.g. games scheduled for the next day) and launches a watcher process 124 for each upcoming game. The launching can involve starting up (initiating, instantiating, etc.) a thread or other computational process on one or more computer systems and/or one or more programmable processors. Each watcher process 124 advantageously starts up before its game is scheduled to begin. Once it is started, the watcher process 124 pulls event data about its watched game from the event data source 114 at some relevant interval. The analysis engine 120 and the prediction daemon can exchange analysis protocols 126 and analysis results 130 as discussed in more detail below.

In the application layer 104, a client application server 140 includes a last event cache 142. The client application server 140 can be in communication with a user database 144, which can include a user table 146 and a user attribute table 150, and also with a game database 152, which can include an analysis table 154, a play-by-play (PBP) table 156, and a game table 160 as discussed in more detail below.

The client layer 106 can include authentication functionality 170 as well as a component or components for requesting information about current or upcoming games (today's games request 172), a last event 174, and a last prediction 176 from the client application server 140 as discussed in more detail below. In some examples, the client layer 106 can be part of or otherwise associated with a television or other video broadcast of a sporting event such as a baseball game. For example, the predictions discussed herein can be shown via one or more graphical overlays upon or windows embedded within a video stream showing a baseball game or other sporting event.

Figure 2:
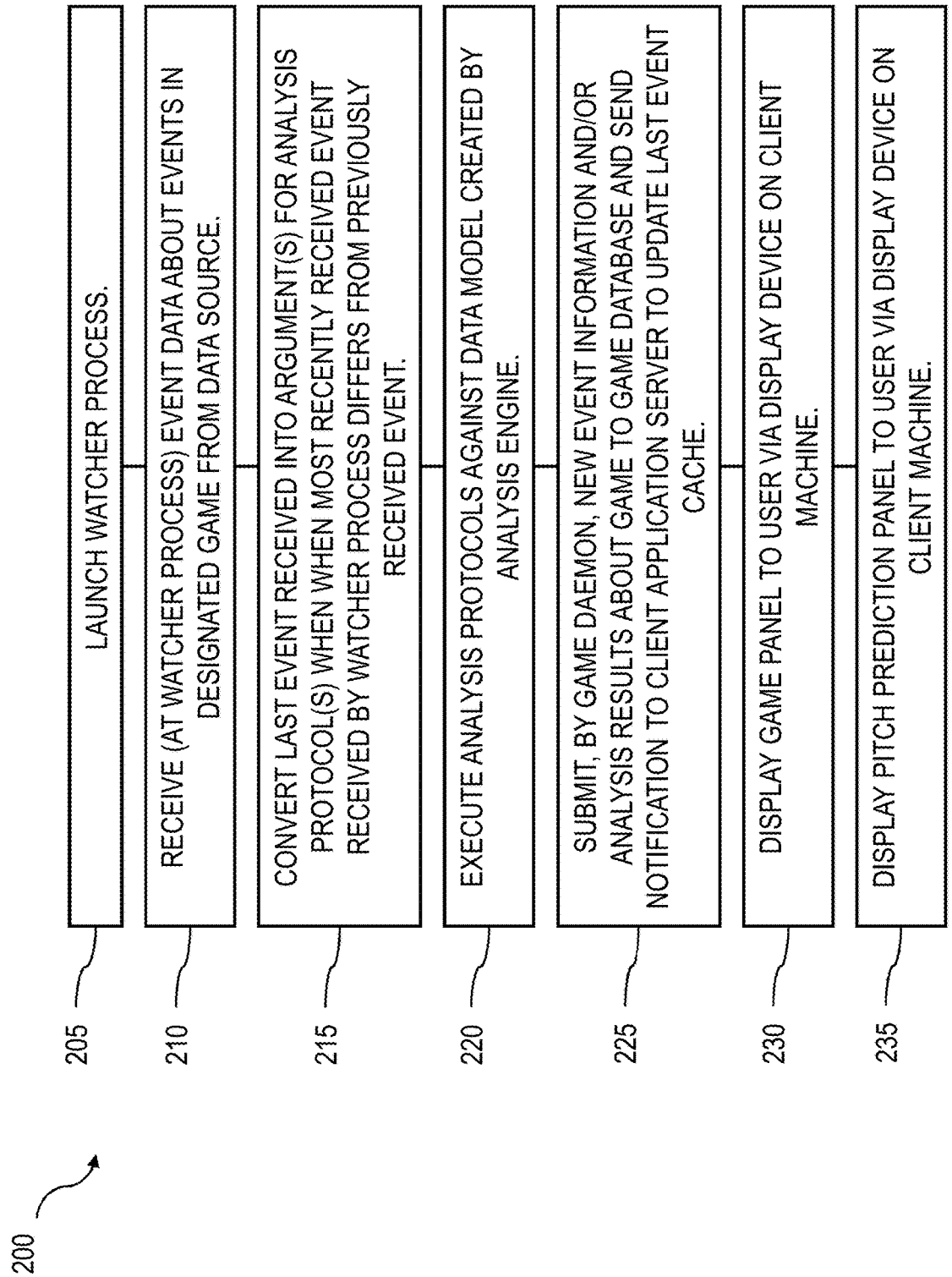
FIG. 2 shows a process flow diagram illustrating aspects of a method having one or more features consistent with implementations of the current subject matter.

FIG. 2 shows a process flow chart 200 illustrating features of a method consistent with implementations of the current subject matter. At 205, a watcher process 124 is launched (e.g. initiated, instantiated, etc.) to correspond to a designated game. The watcher process 124 performs tasks relating to tracking events occurring in the game for which the watcher process 124 is launched.

During the game (which as noted elsewhere herein, can broadly refer to some collection of events for which relevant historical data are available and for which outcome predictions are desired), at 210, the game watcher process receives event data pertaining to the designated game from an event data source. The event data source in some examples can be an external event API 114, and the receiving of event data can occur as part of a pull operation (e.g. pulling the event data from event data source driven by periodic requests from the watcher process 124), a push operation (e.g. the watcher process receiving the event data pushed to it by the event data source), according to a preset schedule, or the like. The watcher process 124 can advantageously pull event data from the event data source 114 on regularly or irregularly spaced time periods, which can have a duration that is relevant to the parameters of the designated game (e.g. every 5 seconds, etc.). A relevant duration can be defined as a period having a sufficiently short duration to ensure capture of a newly generated quantum of event data prior to a next event in the designated game for which a prediction can be generated but also of sufficiently long duration to avoid multiple calls to the event data source 114 for which no new event data has been generated.

In the illustrative example of a baseball game, the period can be on the order of one to a few seconds such that event data regarding a most recent pitch and any other relevant game events (e.g. a change in locations or numbers of base runners due to a stolen base or a caught stealing or pickoff, etc.) can be received in time to be reflected in a prediction for a next pitch. In some examples, a push operation can be advantageous for supplying event data to a watcher process 114, assuming that the event data source 114 is configured appropriately. In an example in which the event data source 114 is a third party (e.g. external) application programming interface (API), a data query engine can be used as an intermediary such that the data query engine accesses the third party API via a pull operation with some set frequency (e.g. every second) and in turn pushes relevant data to each of one or more concurrently running watcher processes 124. Alternatively, a call for new event from the watcher process 124, a push of new event data from the event data source 114, and/or a scheduling of a later delivery of event data can be triggered or otherwise determined by previously received event data. For example, in a baseball context, receipt by the watcher process 124 of event data indicating a last out of an inning can cause the watcher process to delay a next call for a pull of event data for an expected time period before a next inning begins (e.g. 2 minutes, etc.).

At 215, when a most recently received event received by the watcher process 124 differs from a previously received event (e.g. because an additional, new event has occurred during the designated game), the watcher process 124 converts the most recently event received into one or more arguments for one or more analysis protocols 126 (e.g. baseball analysis protocols, soccer analysis protocols, etc.) and then runs the analysis protocols 126 against the analysis engine 120. The analysis engine 120 converts each analysis protocol 126 into one or more algorithms, which it runs against the historical data received from the historical data source 112 to generate analysis results 130, which are returned to the prediction daemon 122.

At 220, the one or more analysis protocols are executed against a data model created by the analysis engine 120. The analysis engine 120 calculates adjusted probabilities of outcomes given the situational variables of the current game state. In a example in which the designated game is a baseball game, outcomes for which adjusted probabilities can be calculated can include one or more of pitch outcomes, at-bat outcomes, scoring outcomes, game result outcomes, etc. In another example in which the designated game is soccer, outcomes for which adjusted probabilities can be calculated can include one or more of which player will score next, likelihood of a penalty kick being successful, a probability of a goal being scored within a certain amount of time, which team is likely to score next, etc. In yet another example in which the designated game is American football, the outcomes for which adjusted probabilities can be calculated can include one or more of which player will score next, whether a field goal will be made or missed, which team will score next, whether a next play will be a running play or a passing play, whether a penalty will be called on the next play, etc.

In some examples, an analysis engine 120 can include a statistics engine, which can optionally be implemented via a cloud-based service, or on dedicated machines. The analysis engine 120 can be based on one or more programming models, such as for example MapReduce or the like, and can be capable of calculating analysis statistics in parallel. Additionally, the analysis engine 120 can include modules for different variable types. The analysis engine can also calculate enrichment statistics and can perform one or more statistical tests, for example, using a tag overlap analysis method. Tag overlap can be characterized as a situation in which tagged values overlap with the members of a data set n more than would be expected by random chance. For numeric variables, this inquiry can involve determining whether the data distributions are significantly different, for example using a T-test, or one or more non-parametric tests. In some implementations of the current subject matter, the analysis engine 120 can implement one or more machine learning methods.

The analysis engine 120 is configured based on data from the historical data source 112. In the example of a baseball game event prediction, the historical data source 112, which includes multivariate data relevant to the predictions being made. The analysis engine 120 converts the one or more analysis protocols 126, runs the algorithm, and returns the analysis results 130 to the prediction daemon 122. In this manner, the historical database is converted to a smaller footprint via various compression techniques.

The historical data source 112 can generally include data from one or more databases or other sources that is relevant to outcome predictions for the type of game being analyzed. For example, for a baseball prediction implementation, the historical data source 112 can include one or more databases storing baseball historical data, such as for example player and action outcomes for batters and pitchers with relevant situational information (e.g., the count, number of baserunners and/or outs, current score, inning, other game situation data, specific batter vs. specific hitter outcomes, umpire characteristics, weather, ballpark characteristics, etc.). In a soccer example, the historical data source 112 can include one or more databases storing soccer historical data, such as for example player and action outcomes for players at different positions with relevant situational information (e.g., remaining game time, weather conditions, type of defense being played, outcomes against similar opposing teams or players, outcomes against a given goalie or goalies with similar styles or other characteristics, referee characteristics, current score, etc.). In a non-sports example (e.g. medical outcomes), the historical data source 112 can include one or more databases storing relevant historical data, such as for example patient and treatment variable outcomes for patients, caregivers, treatment approaches, etc. with relevant situational information (e.g., illness state at the start of a treatment, patient age and general health assessment, other treatments or pharmaceuticals recently experienced by the patient, experience level of the caregiver, type of medical setting, etc.).

At 225, when the prediction daemon 122 has new event information and/or analysis results 130 about a game, the prediction daemon 122 submits that information to the appropriate tables in the game database 152 and sends a notification to the client application server 142 to update its last event cache 142 containing latest game and event information.

Figure 3:
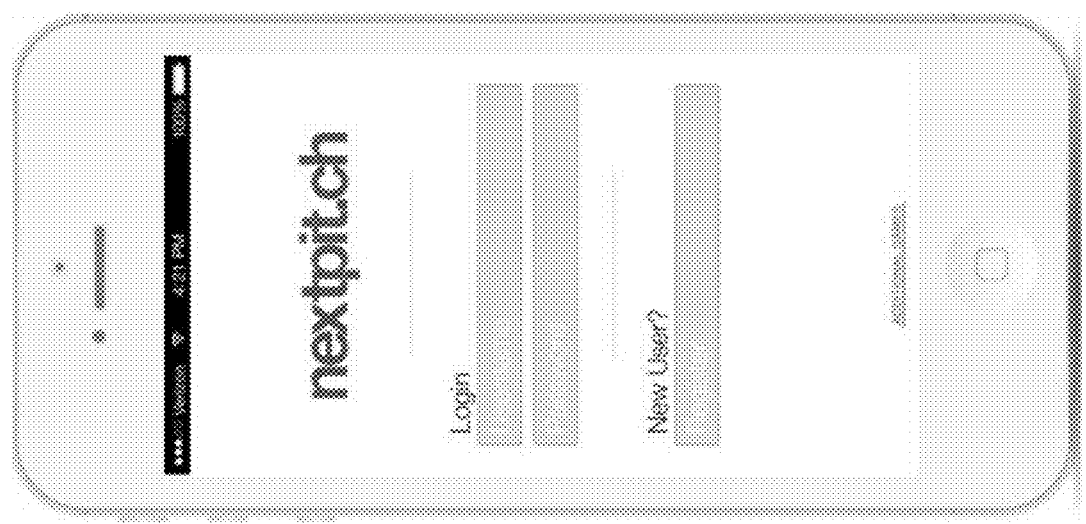
FIG. 3, FIG. 4, FIG. 5, and FIG. 6 show screenshots illustrating features consistent with implementations of the current subject matter.

A user can begin using the prediction system 100 by logging in, or on a first use, by registering for a login identity. These operations can be completed via an authentication module 170 or other similar functionality executing on a client machine, which can be any kind of computing device (e.g. a personal or laptop computer, a mobile device such as a phone or tablet, etc.). FIG. 3 shows a screenshot 300 illustrating an example of a login screen. Logging in can occur via one or more of a Web interface (e.g. accessed via a Web browser executing on a computing device), a dedicated application (e.g. a standalone program separate from a browser such as an "app" running on a computing device), an applet (e.g. a program executed within a browser, such as a Javascript applet), etc. The client application server 140 processes the login request, and authenticates the user for access to the features of the prediction system 100. The client application server 140 can then update the login/registration information in the user database 144.

Figure 4:
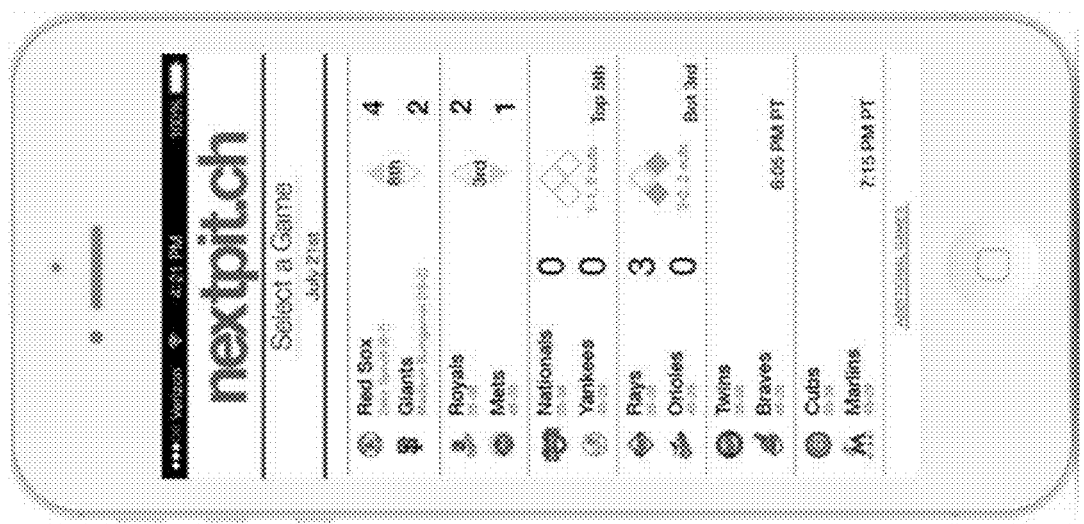

When a user is logged in, a game panel can be displayed to the user via a display device on the client machine at 230. The screenshot 400 of FIG. 4 shows an example of a game panel, which can show a listing or other visual representation of the games that are being played currently or that are scheduled to be played that day, as well as information about those games (e.g. whether or not a game has started, is in progress, or has already ended, the scheduled start time for a game, the team logos, the venue, the records of the teams playing in the game, etc.). For a game that is in progress or already ended, the game panel can display typical box score information, such as for example an in-progress or final score, key individual or team statistics, etc. As noted above, the client layer can supply display data regarding a predicted situational batting average or other relevant outcome predictions relating to a game such that these measures are displayed in conjunction with a video stream showing the game and are dynamically updated according to changes in current game state as reflected by event data about the designated game.

Figure 5:
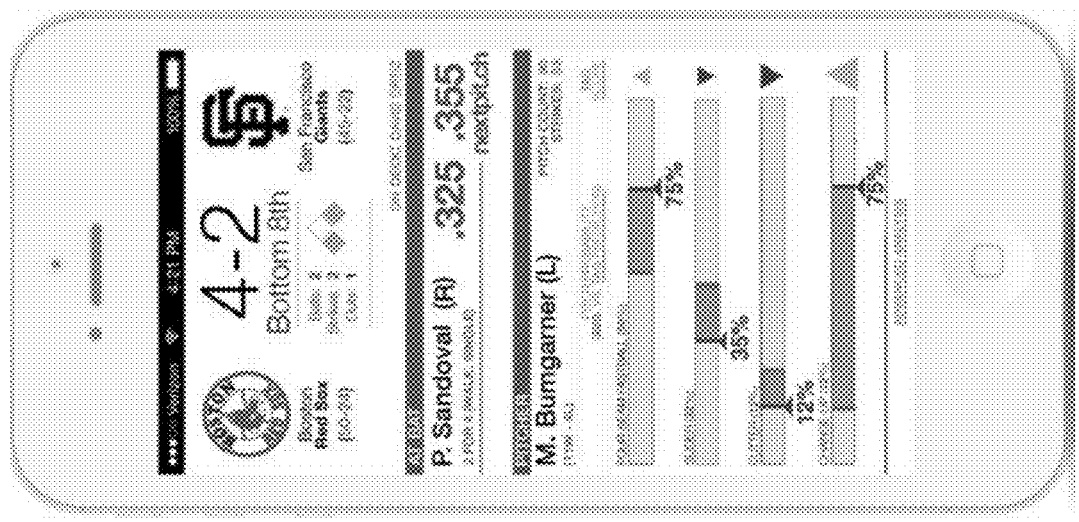
Figure 6:
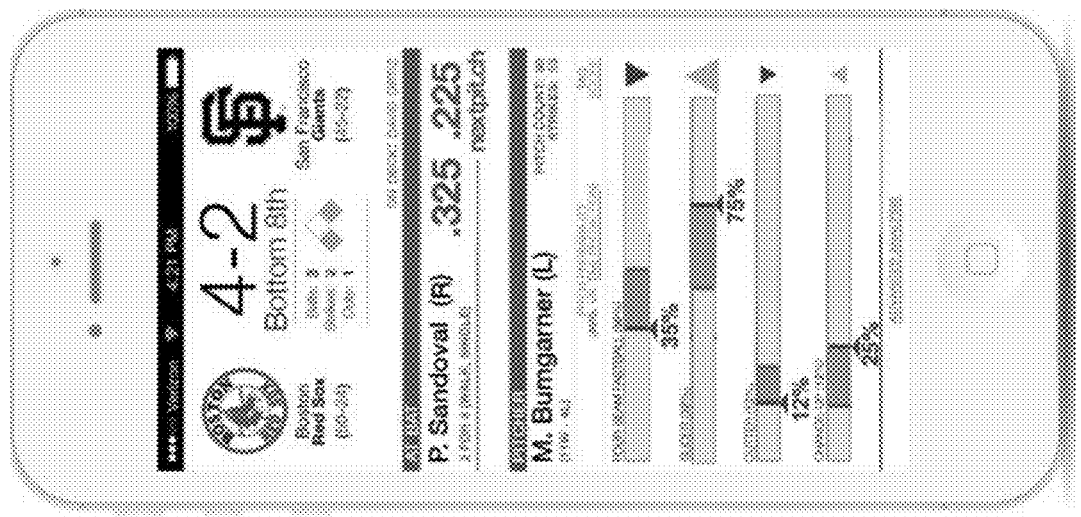

Upon receipt by the client machine of a user choice of a game from the game panel, a pitch prediction panel is displayed at 235. The user's game choice can be recorded in a user attributes table 150 in the user database 144, which can optionally be stored at the application layer 104. FIG. 5 and FIG. 6 show screenshots 600, 700 illustrating an example of a pitch prediction panel consistent with implementations of the current subject matter. In the baseball-related example illustrated in the screenshots of FIG. 3 through FIG. 6, the pitch prediction panel can display the latest information for a single game, such as for example the current state of the game (e.g. one or more of the team that is currently at bat, the inning, the number of outs, the number of runners on base, the pitcher name and whether the pitcher throws right or left handed, the batter name and whether the batter bats right or left handed, the count of balls and strikes, a player image such as a thumbnail picture of the pitcher and/or batter, etc.), as well as the predictions made by the analysis engine 120 about the probability of what will happen next. FIG. 5 shows the pitch prediction panel for a first game situation with a 2 ball, 2 strike count and 2 outs in the bottom of the $8^{th}$ inning, and FIG. 6 shows the pitch prediction panel for a second game situation a pitch later, with the count now 3 balls and 2 strikes. The batter's predicted situational batting average for the current situation is updated from 0.355 in FIG. 5 to 0.225 in FIG. 6 to reflect predictions by the analysis engine 120.

In some implementations of the current subject matter, requests for predictions can be limited to coming from authenticated users of the prediction system 100. After competing the authentication process, the client layer 106 can receive an authentication key. The client layer 106 can use the authentication key to query the client application server 140. Queries can include getting information about all games today, the last event for a given game, and the last prediction made by the system for a given game.

The examples presented herein are discussed in relation to an implementation for providing outcome predictions in association with the sport of baseball. It will be readily understood that similar approaches can be applied both to other sports and as to other situations unrelated to sports in which data-driven predictions have value. For example, use of the term "game" should be interpreted to refer to any kind of sporting event (e.g. a match, a contest, a meet, a competition, etc. Additionally, in a non-sports example, "game" can refer to an event or set of events during or for which data-driven predictions are made.

In some implementations of the current subject matter, outcome predictions generated using one or more of the features described herein can be used for generating odds for gambling transactions relating to "proposition bets" that may be made during the course of a game. For example, a prediction that a most likely next player to score a goal in a soccer match can include a probability of this outcome. Odds for a proposition wager regarding which player will score next can offer a payout of somewhat less than this statistical probability such that the "house" (e.g. the wagering establishment) receives a profit on each wager. For example, if the probability of player X being the next to score a goal is calculated using the above-noted techniques to be 20%, a wager can be offered in which a gambler makes a wager for $1 which, if successful, would pay the gambler back $4 (a 4 to 1 payoff rather than the 5 to 1 payoff that would be indicated by the 20% probability).

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to an content resource management system, an enterprise resource software system, or other business software solution or architecture, it should be readily understood that such features are not intended to be limiting.

Implementations of the current subject matter can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that are configured to, when executed by at least one programmable processor, cause the at least one programmable processor to perform operations comprising:

initiating a watcher process to correspond to a designated game;

based at least on the initiating of the watcher process, automatically pulling, from an event data source via the watcher process, event data, the event data representative of a plurality of events occurring in the designated game, the automatic pulling the event data from the event data source comprising (i) periodically generating a request for the event data; and (ii) causing transmitting of the request for the event data to the event source, a frequency for the periodic generating of the request for the event data selected based at least in part on a relevant parameter of the designated game such that new event data is generated between a first time of transmitting a first request for the event data and a second time of transmitting a second request for the event data;

determining an event type associated with a most recently pulled event;

setting the frequency for the periodic generating of the request for the event data based on the event type;

converting the event data for the most recently pulled event of the plurality of events into one or more arguments for one or more analysis protocols, the converting occurring based at least in part on the most recently pulled event pulled by the watcher process being new relative to a previously pulled event;

executing the one or more analysis protocols against a data model created by an analysis engine, the executing comprising the analysis engine predicting an adjusted probability of at least one outcome of an event within the designated game, the predicting reflecting the event data for the most recently pulled event; and notifying a client application server to update a last event cache accessible by client application executing on a client machine to display an outcome prediction of the event within the designated game based on the adjusted probability.

2. The computer program product of claim 1, wherein the analysis engine predicting the adjusted probability comprises using a tag overlap analysis method.

3. The computer program product of claim 1, wherein the operations further comprise tracking, via the watcher process, the plurality of events occurring during the designated game.

4. The computer program product of claim 1, wherein the data source comprises an external event application programming interface.

5. The computer program product of claim 1, wherein the operations further comprise submitting, by a game daemon to game database, new event information comprising at least one of information about the most recently pulled event or analysis results comprising the adjusted probability.

6. The computer program product of claim 1, wherein the designated game comprises at least one of a sports contest or a baseball game.

7. The computer program product of claim 1, wherein the designated game comprises a baseball game, and wherein the outcome prediction of the event within the designated game comprises at least one of a pitch outcome, an at-bat outcome, or a scoring outcome.

8. The computer program product of claim 1, wherein the designated game comprises a soccer game, and wherein the outcome prediction of the event within the designated game comprises at least one of an identity of a player most likely to score next, a likelihood of a penalty kick being successful, a probability of a goal being scored within an amount of time, or an identity of a team most likely to score next.

9. The computer program product of claim 1, wherein the designated game comprises an American football game, and wherein the outcome prediction of the event within the designated game comprises at least one of an identity of a player most likely to score next, a likelihood of a field goal being successful, an identity of a team most likely to score next, or whether a next play comprises a running play or a passing play.

10. A system comprising:
computer hardware configured to execute at least one computer program comprising a plurality of computerized instructions, the plurality of computerized instructions configured to, when executed by the computer hardware, cause the computer hardware to perform operations comprising:
initiating a watcher process to correspond to a designated game;
based at least on the initiating of the watcher process, automatically pulling, from an event data source via the watcher process, event data, the event data representative of a plurality of events occurring in the designated game;
converting the event data for a most recently pulled event of the plurality of events into one or more arguments for one or more analysis protocols, the converting occurring based at least in part on the most recently pulled event pulled by the watcher process differs from a previously pulled event;
executing the one or more analysis protocols against a data model created by an analysis engine, the executing comprising the analysis engine predicting an adjusted probability of at least one outcome of an event within the designated game, the predicting the adjusted probability comprising a tag overlap analysis method, the adjusted probability reflecting the event data for the most recently pulled event; and
notifying a client application server to update a last event cache accessible by client application executing on a client machine to display an outcome prediction of the event within the designated game based on the adjusted probability.

11. The system of claim 10, wherein the operations further comprise tracking, via the watcher process, the plurality of events occurring during the designated game.

12. The system of claim 10, wherein the data source comprises an external event application programming interface.

13. The system of claim 10, wherein the operations further comprise submitting, by a game daemon to game database, new event information comprising at least one of information about the most recently pulled event or analysis results comprising the adjusted probability.

14. The system of claim 10, wherein the designated game comprises at least one of a sports contest or a baseball game.

15. A computer-implemented method comprising:
initiating a watcher process to correspond to a designated game;
based at least on the initiating of the watcher process, automatically pulling, from an event data source via the watcher process, event data, the event data representative of a plurality of events occurring in the designated game;
converting the event data for a most recently received event of the plurality of events into one or more arguments for one or more analysis protocols, the converting occurring based at least in part on the most recently pulled event pulled by the watcher process being new relative to a previously received event;
executing the one or more analysis protocols against a data model created by an analysis engine, the executing comprising the analysis engine predicting an adjusted probability of at least one outcome of an event within the designated game, the predicting comprising a tag overlap method, the adjusted probability reflecting the event data for the most recently pulled event; and
notifying a client application server to update a last event cache accessible by client application executing on a client machine to display an outcome prediction of the event within the designated game based on the adjusted probability.

16. The computer-implemented method of claim 15, further comprising tracking, via the watcher process, the plurality of events occurring during the designated game.

17. The computer-implemented method of claim 15, wherein the data source comprises an external event application programming interface.

18. The computer-implemented method of claim 15, further comprising submitting, by a game daemon to game database, new event information comprising at least one of information about the most recently pulled event or analysis results comprising the adjusted probability.

19. A computer program product comprising a non-transitory machine-readable medium storing instructions that are configured to, when executed by at least one programmable processor, cause the at least one programmable processor to perform operations comprising:
initiating a watcher process to correspond to a designated game;
based at least on the initiating of the watcher process, automatically pulling, from an event data source via the watcher process, event data, the event data representative of a plurality of events occurring in the designated game;
converting the event data for a most recently pulled event of the plurality of events into one or more arguments for one or more analysis protocols, the converting occurring based at least in part on the most recently pulled event pulled by the watcher process being new relative to a previously pulled event;
executing the one or more analysis protocols against a data model created by an analysis engine, the executing comprising the analysis engine predicting an adjusted probability of at least one outcome of an event within the designated game, the predicting comprising a tag overlap method, the adjusted probability reflecting the event data for the most recently pulled event; and
notifying a client application server to update a last event cache accessible by client application executing on a client machine to display an outcome prediction of the event within the designated game based on the adjusted probability.

\* \* \* \* \*